3,249,565
WEATHER RESISTANT HALOGEN-CONTAINING POLYESTER RESINS COMPRISING 2,4-DIHYDROXYBENZOPHENONE
Paul Robitschek, Eugene, Oreg., assignor to Hooker Chemical Corporation, Niagara Falls, N.Y., a corporation of New York
No Drawing. Filed Apr. 28, 1965, Ser. No. 451,628
10 Claims. (Cl. 260—22)

This is a continuation-in-part of copending application, Serial No. 133,549, filed August 24, 1961, now abandoned, which was a continuation-in-part of application Serial No. 438,595, filed June 22, 1954, now abandoned.

The invention relates to new compositions of matter comprising polymerizable, unsaturated, halogen-containing polyester resins and certain chemical additives incorporated therein which are effective in improving the weather resistance of the polymerized polyester resins, i.e., in preventing discoloration, embrittlement and erosion of the polyester resin because of exposure to the atmospheric elements, including sunlight, rainfall, wind, and the like. The polymerized unsaturated polyester resins embraced within the scope of this invention are insoluble, infusible compositions which are prepared by reacting a polybasic acid with a polyhydric alcohol to form a linear polyester having copolymerizable unsaturation, then cross-linking or copolymerizing the linear polyester so formed with olefinic type monomers.

More particularly, this invention relates to improving the weather resistance, especially resistance to discoloration on exposure to sunlight, of such polyester resins when they contain halogen atoms, either by being chemically-combined in the polyester resin per se or by being present in an additive, filler or other ingredient physically-combined in the resin. Polyester resins embraced within the scope of this invention which contain halogen chemically-combined in the polyester resin per se can be prepared by employing a halogen-containing polycarboxylic acid and/or a halogen-containing polyhydric alcohol in the esterification reaction and/or a halogen-containing monomeric olefin in the cross-linking or copolymerization reaction. United States Patent 2,779,701, describes the preparation of flame retardant polyester resinous compositions containing halogen chemically-combined in the polyester resin. Another specific type of polyester resin which contains halogen in chemical combination in the polyester resin can be prepared by employing a tetrachlorophthalic anhydride or other similar acid, or anhydrides containing chlorine, in the esterification reaction. Polyester resins containing halogen in an additive or filler are best illustrated by those having chlorinated paraffin intermixed therein usually for the purpose of rendering the final resin flame retardant. Halogen-containing polyester resins containing between fifteen percent and thirty-five percent chlorine are especially preferred in practicing this invention. It is to halogen-containing polyester resins of the types described aforesaid that the present invention is more particularly concerned.

The production of infusible, insoluble polyester resins which are both flame retardant and resistant to deterioration on exposure to weather and which possess a reasonable balance of other necessary properties is of considerable commercial importance. Although satisfactory flame retardant polyester resins can be produced by chemically combining halogen in the polyester resin, these halogenated materials exert an undesirable influence in the final polymerized polyester resin by causing certain objectionable characteristics, including discoloration of the polymerized resin when it is exposed to sunlight. For example, on normal exposure of a fiber glass reinforced panel of a polyester resin containing about 25 percent chemically-combined chlorine to weather over a period of months, severe darkening in color results, erosion of the surface including crazing, pitting and dulling occurs, and even exposure of the reinforcing fibers employed to strengthen the resins is encountered. In addition, the panels of resin suffer a loss in mechanical strength and desirable aesthetic properties. These undesirable characteristics are exceptionally objectionable in cases where the reinforced laminate panels of polyester resin are to be used as wall coverings or skylights which must be flame retardant for safety purposes, and yet which must be exposed to light or weather because of their very purpose.

It is, therefore, an object of this invention to provide a polymerized halogen-containing polyester resin product possessing improved weather resistance. Another object is to provide a composition comprising a polymerized halogen-containing polyester resin and stabilizer systems therefor made up of one or more stabilizers, which can be employed in various proportions and in various combinations with each other depending upon the severity and conditions of exposure which the finally polymerized resin is expected to encounter. It is still another object of this invention to provide polymerized halogen-containing polyester resins which are stabilized against the darkening and embrittling effects of sunlight. A further object is to provide novel light stabilizer mixtures useful in halogen-containing resins. Other objects of this invention will be apparent to those skilled in the art on consideration of the complete specification and claims.

I have now found that improvements in weather resistance of halogen-containing polyester resins can be realized in incorporating a stabilizing amount of certain 2-hydroxybenzophenones in said polyester resin. The benzophenone compounds of the invention have a hydroxyl group in the 2-position of a phenyl ring thereof, and a hydroxyl or methoxy group in the 4-position of the same phenyl ring. The compounds are 2,4-dihydroxybenzophenone; 2,2'-dihydroxy-4,4'-dimethoxybenzophenone; and 2-hydroxy-4-methoxybenzophenone, which is equivalent thereto by virtue of the hydroxyl substituent in the 2-position and the methoxy substituent in the 4-position. I have also found that further improvements or enhancement of the weather resistance of such polyester resins may be realized by adding to the polyester resin, in addition to the hydroxybenzophenone, a stabilizing amount of an epoxy compound having an epoxy oxygen atom between two vicinal carbon atoms, or, by adding to the polyester resin a stabilizing amount of an organic phosphite; and, that the addition of the epoxy compound to a resin already containing the 2-hydroxybenzophenone results in a synergistic effect on the enhancement realized. Still further, I have found that maximum improvement or enhancement can be obtained by adding stabilizing amounts of all three components, i.e., the hydroxybenzophenone, an epoxy compound and an organic phosphite, to the halogen-containing polyester resin to be improved or stabilized against the adverse effects of exposure to weather.

The following examples are given to illustrate the specific features of this invention, but are not to be construed as limiting. All proportions are by weight, and temperatures are in degrees centigrade except where indicated otherwise. The stabilized compositions were made by simply mixing and dissolving the stabilizer or stabilizer combination with the liquid polyester resin to be stabilized in the weight percentages indicated, then effecting the polymerization of the mixture, in the presence of a catalyst consisting of about 2 percent by weight of a mixture containing 50 percent by weight of benzoyl peroxide in tricresyl phosphate, by heating to a temperature of about 80 degrees centigrade for about 16 hours in an oven. To allow for consistent and uniform results, so that comparisons can be made, an accelerated procedure for evaluating weather resistance was employed which involved exposing standardized 2" x 6", one-ply, glass fiber laminates (Owens-Corning Fiberglas Corporation Mat No. 16) containing about 30 percent by weight of glass and about 70 percent by weight of resin in an accelerated weathering device, model (DLTS–X) manufactured by the Atlas Electric Devices Company, Inc., Chicago, Illinois, and sold under their trademark, Weather-ometer. An exposure time of 500 hours was employed, a temperature of 65 degrees centigrade was maintained, and a ratio of 102 minutes of light to 18 minutes of water was used throughout the test. After such exposure, the glass fiber laminate panels were rated according to their decrease in light transmission values when evaluated with a photovoltaic cell (General Electric Company 8PV1AAF), and a controlled light source (60 watt-120 volt Westinghouse Electric Corporation frosted bulb with a Corning Glass Works #4308 filter). Perfect stabilization is represented by a rating of 200, while less perfect stabilization is represented by progressively lower ratings.

*Example 1*

An unpolymerized liquid unsaturated polyester resin was prepared by esterifying about 53 parts of ethylene glycol and 90 parts of diethylene glycol with about 395 parts of 1,4,5,6,7,7-hexachlorobicyclo-(2.2.1)-5-heptene-2,3-dicarboxylic anhydride (which was prepared by the Diels-Alder reaction of hexachlorocyclopentadiene with maleic anhydride) and about 71 parts of maleic anhydride. About 30 parts of styrene and about 100 parts of product produced by the esterification reaction were mixed together until complete solution was attained to give a clear, substantially colorless solution of liquid polyester resin having a viscosity of about 30 poises at 25 degrees centigrade on a Gardner bubble viscometer and having a chlorine content of about 30 percent by weight of the total.

In the manner of the foregoing description, using samples of resin produced by Example 1, the following results were obtained after exposure of the test panels in the Weather-ometer from the stabilizer systems given in the following table:

| Example No. | Stabilizer System | Rating |
|---|---|---|
| 2 | Blank | 102 |
| 3 | 0.2% 2,4-dihydroxybenzophenone | 133 |
| 4 | 0.2% 2,4-dihydroxy benzophenone plus 3.0% epoxidized soybean oil | 143 |
| 5 | 0.2% 2,4-dihydroxybenzophenone plus 3.0% epoxidized soybean oil plus 0.5% triphenylphosphite | 155 |
| 6 | 0.2% of a mixture of 2,2',4-trihydroxy-4'-methoxybenzophenone; 2,2'-dihydroxy-4,4'-dimethoxybenzophenone and 2,2',4,4'-tetrahydroxybenzophenone. | 164 |
| 7 | 0.2% of the mixture of 2-hydroxybenzophenones in Example 6 plus 3.0% epoxidized soybean oil. | 170 |
| 8 | 0.2% of the mixture of 2-hydroxybenzophenones in Example 6 plus 3.0% epoxidized soybean oil plus 0.5% triphenylphosphite. | 188 |
| 9 | 1% 2-hydroxy-4-methoxy-benzophenone | 178 |
| 10 | 1% 2-hydroxy-4-methoxy-benzophenone plus 3% epoxidized soybean oil | 183 |
| 11 | 1% 2-hydroxy-4-methoxy-benzophenone plus 3% epoxidized soybean oil plus 0.5% triphenylphosphite. | 187 |
| 12 | 0.2% of the mixture of 2-hydroxybenzophenones in Example 6 plus 3.0% of allyl glycidyl ether. | 181 |
| 13 | 0.2% of the mixture of 2-hydroxybenzophenones in Example 6 plus 0.5% of epichlorohydrin. | 179 |
| 14 | 0.2% of the mixture of 2-hydroxybenzophenones in Example 6 plus 3.0% of epichlorohydrin. | 196 |

On comparison of the foregoing results with those which are given in the following examples, the synergistic effect of the epoxy compounds of this invention and/or the organic phosphites of this invention on the 2-hydroxybenzophenones is readily apparent.

| Example No. | Stabilizer System | Rating |
|---|---|---|
| 15 | 3% epoxidized soybean oil | 119 |
| 16 | 0.5% triphenylphosphite | 100 |
| 17 | 3% epoxidized soybean oil plus 0.5% triphenylphosphite. | 123 |
| 18 | 2% of the mixture of 2-hydroxybenzophenones in Example 6 plus 0.5% triphenylphosphite. | 162 |

In like manner, similar results have been obtained when an unpolymerized liquid unsaturated polyester resin containing tetrachlorophthalic anhydride in place of the hexachlorobicycloheptene dicarboxylic anhydride given in Example 1 is employed with the stabilizer systems given above. For example, when using 0.2 part of the mixture of 2,2,4-trihydroxy-4'-methoxybenzophenone with 2,2'-dihydroxy-4,4'-dimethoxybenzophenone and 2,2',4,4'-tetrahydroxybenzophenone and 3 percent of epoxidized soybean oil as the stabilizer system for a polyester resin containing 20 percent chlorine made from tetrachlorophthalic anhydride, a rating of 140 is obtained when tested in the manner of the foregoing examples, as against a rating of 53 for the unstabilized blank or control. Likewise, similar improved results are obtained when chlorinated paraffin additive containing about 65 percent by weight of chlorine is included in a commercially available hydrocarbon type polyester resin made from phthalic anhydride, instead of the tetrachlorophthalic anhydride given above.

One-ply glass fiber laminates prepared by the method of the description given above and using a sample of unpolymerized liquid unsaturated polyester resin prepared in the manner of Example 1, which were stabilized with the stabilizer systems given in Examples 2, 6, 7 and 8, were exposed outdoors in Florida at a 45° incline facing south continuously during the months of March through May. These samples were examined periodically and rated as follows by visual observation:

NC=No change
x=Very slight change
xx=Slight change
xxx=Definite change
xxxx=Medium
xxxxx=Bad
xxxxxx=Very bad

| Example No. | Time of Exposure | | |
|---|---|---|---|
| | 1 month | 2 months | 3 months |
| 2 | xxxx | xxxxx | xxxxx |
| 6 | x | x | xx |
| 7 | NC | x | x |
| 8 | NC | x | x |

Thus, after one month of continuous exposure in Florida, resins stabilized in accordance with this invention showed little or no sign of deterioration insofar as discoloration, embrittlement or erosion is concerned, whereas, the unstabilized resin was seriously affected, and after 3 months the resins of this invention were still in satisfactory condition.

The proportion of hydroxybenzophenone which can be employed in the compositions of this invention can be varied between 0.01 to 10 percent by weight of the total material to be stabilized depending on the ultimate stabilizer combination to be employed and the severity of weather conditions the polymerized resin is expected to withstand. Expressed another way, 0.01 to 10 parts of the 2-hydroxybenzophenone compound can be employed per one hundred parts by weight of the halogen-containing resin. It is preferred to use from 0.01 to 5 percent by weight of the benzophenone.

Among the epoxy compounds which can be employed in accordance with this invention are those having an epoxy oxygen atom between two vicinal carbon atoms, to wit, those containing the grouping

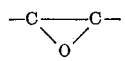

for example, alkene oxides, such as propylene oxide, butylene oxide; the aralkene oxides, such as phenoxy propylene oxide, methoxyethylene oxide and parachlorophenoxypropylene oxide; glycidyl esters, such as glycidyl laurate; diglycidyl ethers, such as epoxypropyl ethers of bisphenols, diglycidyl ether of diphenylol propane; 2,2-bis[(4-(2,3-epoxypropoxy)phenyl)] propane; 2,2-bis[(4-(2,3-epoxypropoxy)-3-methyl phenyl)] propane; 2,2-bis-[4-(2,3-epoxypropoxy)phenyl] butane; 4,4'-bis[2,3-epoxypropoxy] diphenyl; halohydrins, such as epiclorohydrin; partially or completely epoxidized unsaturated fatty oils, such as epoxidized linseed oil, epoxidized soybean oil and epoxidized castor oil, epoxidized corn oil, epoxidized cottonseed oil, epoxidized peanut oil, and the like.

The proportion of epoxy compounds which can be employed in the compositions of this invention is between zero percent and 10 percent by weight of the total material to be stabilized. When the polymerized resin is only expected to withstand mild weathering conditions, such as encountered indoors, the desired stabilizing effect can be obtained by using the hydroxybenzophenones alone, in proportions which can be derived from the examples given herein. However, in order to realize more satisfactory resistance to weathering of a resin to be exposed to the direct rays of sunlight containing in the order of about 15 to 45 percent chlorine, I have found it desirable to use between about 2 and 6 percent by weight of the epoxy compound when about 0.2 to 1.0 by weight of a 2-hydroxybenzophenone is employed.

Among the organic phosphites which can be employed in accordance with this invention are those having the formula $(RO)_2XP$, wherein R is an organic radical and X is selected from hydrogen and another RO group. The organic radicals are preferably alkyl of 1 to 12 carbon atoms, alkenyl of 1 to 12 carbon atoms, aryl or aralkyl of 6 to 12 carbon atoms, as well as halogen substituted radicals, particularly chlorine and bromine substituted hydrocarbon radicals. Examples of the organic phosphites are:

Trialkyl phosphites, such as trimethyl phosphite, triethyl phosphite, tripropyl phosphite, tris(chloroethyl) phosphite, etc.;
Trialkenyl phosphites, such as triallyl phosphite, trivinyl phosphite, etc.;
Triaryl or triaralkyl phosphites, such as triphenyl phosphite and tritolyl phosphite;
Tri(aryl-alkenyl) phosphites, such as allyl diphenyl phosphite and divinyl phenyl phosphite;
Dialkyl hydrogen phosphites;
Dialkenyl hydrogen phosphites;
Diaryl hydrogen phosphites;
Diaralkyl hydrogen phosphites;
Di(aryl-alkenyl) hydrogen phosphites, and the like.

The proportion of organic phosphite compound which may be employed in the final formulation of this invention is between 0 and 5 percent by weight of the total material to be stabilized. However, when employing a triorgano phosphite, it is preferred to employ below about 2 percent, since this lower percentage avoids interference with gelation or curing of the resin to be polymerized; however, up to 5 percent of a triorgano phosphite may be employed if particular care and conditions are employed in the polymerization reaction; however, polymerization occurs with great difficulty even under these exceptional circumstances.

Expressed in another way, zero to 5 parts of the phosphite ester per one hundred parts by weight of halogen-containing resin can be employed. It is preferred to use 0.1 to 5 parts of the phosphite ester per one hundred parts by weight of halogen-containing resin. Especially preferred is 0.3 to 1 part of the tri(hydrocarbon) phosphite.

The stabilizer systems of this invention are generally applicable to any halogen-containing unsaturated polyester resin, whether the halogen atom is chemically-combined in the polyester resin per se or is present by being chemically-combined in an additive or filler which is physically combined in the resin. The invention is most suitably employed on chlorine containing polyester resins; however, bromine and/or fluorine containing or chloro-bromo, fluoro-bromo, or other mixed halogenated polyesters may be employed. A preferred class of halogen-containing polyester resins is described in United States Patent 2,779,701, wherein there are described polyesters having hexahalocyclopentadienes chemically combined therein, wherein the halogen is selected from the group consisting of fluorine, chlorine and bromine. Diels-Alder adducts of hexachlorocyclopentadiene are preferred. For example, a preferred resin to be stabilized in accordance with this invention is formed by reacting about equimolar amounts of hexachlorocyclopentadiene with maleic anhydride to form 1,4,5,6,7,7-hexachlorobicyclo-(2.2.1)-5-heptene-2,3-dicarboxylic anhydride, then esterifying this material with ethylene glycol in the presence of some maleic anhydride. The resulting reaction product is then mixed with an unsaturated, copolymerizable monomer such as styrene to form a polymerizable mixture which may be copolymerized or cured by heat, light, etc., in the presence of the usual peroxide catalyst known in this art, to form the final insoluble infusible cured polyester resin. 1,4,5,6,7,7-hexachlorobicyclo-(2.2.1)-5-heptene-2,3-dicarboxylic acid is also a desirable starting material for such resins. A method of incorporating the stabilizer systems of this invention into the polyester resin is to mix them into the liquid polymerizable mixture of unsaturated polyester resin prior to the curing or polymerization reaction. In order to obtain the maximum effect, the stabilizers employed must be compatible with the components of the composition. Suitable solvents can be employed for dissolving the stabilizer prior to incorporating it into the desired polyester resin. When this is done, low boiling solvents which can be easily removed, are preferred. In certain instances it may be desirable to make the stabilized resin compositions of this invention by adding the stabilizer system to the unsaturated linear polyester resin at the time the olefinic monomer is mixed with it, and when this is done, especially if hot materials are used to facilitate and hasten mixing, it is important to use high boiling stabilizers which are compatible in the system so that losses due to evaporation, etc., are largely avoided.

In many polyester resin compositions, various proportions of the commercially available unsaturated polyesters are combined for the purpose of obtaining a finally polymerized resin having one or more characteristics, especially enhanced or improved over that of any of its individual components. I have found that improved weathering resistance of such mixed resins can be achieved by employing the stabilizer combinations of this invention even where the halogen content of the finally polymerized resin is very low, e.g., on the order of 2 to 6 percent by weight of the total.

The selection of the particular stabilizer combination or system to be used in making the compositions of this invention depends upon the final use to which the halogen-containing polymerized resins are to be put. A combination of the hydroxybenzophenone, an epoxy compound and an organic phosphite is particularly effective in resistance to weathering on outdoor exposure and/or to Weather-ometer exposure. When using this system outstanding resistance to weathering is obtained as exemplified in the examples given herein. A resin having such a stabilizing system incorporated therein can be satisfactorily used where severe weathering conditions are contemplated, such as in laminates or panels of resin to be employed in skylights to be used in the Southern States, such as Florida, where excessive exposure to sunlight and rainfall are usually encountered. In cases where the final polymerized resin is to be employed indoors, in room partitions, dividers, and the like, and where excessive exposure to the atmospheric elements is not contemplated, a particularly suitable stabilizer system involves the use of the hydroxybenzophenone alone.

Varying proportions of the different ingredients which make up the stabilizer systems of this invention are used to obtain the optimum results for the desired application of the resins involved herein. To effectively stabilize a halogen-containing unsaturated polyester resin when in a polymerized state against the deleterious action of the atmospheric elements from about 0.2 to 1 percent by weight of the hydroxybenzophenone and from about 2 to 6 percent of the epoxy compounds disclosed herein or from about 0.2 to 1 percent of the organic phosphite compounds disclosed herein should be incorporated in the liquid polyesters to be stabilized prior to curing or polymerization. However, this will depend upon all the conditions of exposure the finally polymerized resin is expected to encounter such as temperature, light, time, humidity, rainfall, and the like. The optimum proportions to be used in each case are, therefore, readily determined.

I claim:

1. A composition of matter comprising a halogen-containing, unsaturated polyester of a polybasic acid and a polyhydric alcohol, said halogen being provided by a hexahalocyclopentadiene component wherein the halogen atoms are selected from the group consisting of fluorine, chlorine and bromine, and as a weather-resistant agent therefor, from about 0.01 to 5 percent by weight of 2,4-dihydroxybenzophenone.

2. A composition of matter comprising a halogen-containing, unsaturated polyester of a polybasic acid and a polyhydric alcohol, said halogen being provided by a hexahalocyclopentadiene component wherein the halogen atoms are selected from the group consisting of fluorine, chlorine and bromine, and as a weather-resistant agent therefor, from about 0.01 to 5 percent by weight of 2,2'-dihydroxy-4,4'-dimethoxybenzophenone.

3. A composition of matter comprising a halogen-containing, unsaturated polyester of a polybasic acid and a polyhydric alcohol, and as a weather-resistant agent therefor, from about 0.01 to 5 percent by weight of 2,4-dihydroxybenzophenone, and up to 10 percent by weight of an epoxy compound having an epoxy oxygen atom between two vicinal carbon atoms.

4. A composition according to claim 3 wherein the epoxy compound is epoxidized soybean oil and is present in an amount from 2 to 6 percent by weight of the polyester.

5. A composition of matter comprising a halogen-containing, unsaturated polyester of a polybasic acid and a polyhydric alcohol, and as a weather-resistant agent therefor, from about 0.01 to 5 percent by weight of 2,2'-dihydroxy-4,4'-dimethoxybenzophenone, and up to 10 percent by weight of an epoxy compound having an epoxy oxygen atom between two vicinal carbon atoms.

6. A composition according to claim 5 wherein the epoxy compound is epoxidized soybean oil and is present in an amount from 2 to 6 percent by weight of the polyester.

7. A composition of matter comprising a halogen-containing, unsaturated polyester of a polybasic acid and a polyhydric alcohol, and as a weather-resistant agent therefor, from about 0.01 to 5 percent by weight of 2,4-dihydroxybenzophenone; up to 10 percent by weight of an epoxy compound having an epoxy oxygen atom between two vicinal carbon atoms, and up to 5 percent by weight of an organic phosphite having the general formula $(RO)_2XP$ wherein R is an organic radical and X is selected from the group consisting of a hydrogen atom and another (RO) group; said percentages being based on the total weight of the polyester.

8. A composition according to claim 7 wherein the epoxy compound is epoxidized soybean oil and is present in an amount from 2 to 6 percent by weight of the polyester, and the organic phosphite is triphenylphosphite and is present in an amount from 0.2 to 1 percent by weight of the polyester.

9. A composition of matter comprising a halogen-containing, unsaturated polyester of a polybasic acid and a polyhydric alcohol, and as a weather resistant agent therefor, from about 0.01 to 5 percent by weight of 2,2'-dihydroxy-4,4'-dimethoxybenzophenone; up to 10 percent by weight of an epoxy compound having an epoxy oxygen atom between two vicinal carbon atoms, and up to 5 percent by weight of an organic phosphite having the general formula $(RO)_2XP$, wherein R is an organic radical and X is selected from the group consisting of a hydrogen atom and another (RO) group; said percentages being based on the total weight of the polyester.

10. A composition according to claim 9 wherein the epoxy compound is epoxidized soybean oil and is present in an amount from 2 to 6 percent by weight of the polyester, and the organic phosphite is triphenylphosphite and is present in an amount from 0.2 to 1 percent by weight of the polyester.

References Cited by the Examiner

UNITED STATES PATENTS

| | | | |
|---|---|---|---|
| 2,456,216 | 12/1948 | Richter | 260—45.7 |
| 2,556,145 | 6/1951 | Niederhauser | 260—23 |
| 2,564,646 | 8/1951 | Leisnter et al. | 260—45.7 |
| 2,572,571 | 10/1951 | Marling | 260—45.7 |
| 2,669,549 | 2/1954 | Darby | 260—23 |
| 2,777,828 | 1/1957 | Day et al. | 260—45.95 |

LEON J. BERCOVITZ, *Primary Examiner.*

R. W. GRIFFIN, *Assistant Examiner.*